(12) United States Patent
Shakudo

(10) Patent No.: US 11,537,150 B2
(45) Date of Patent: Dec. 27, 2022

(54) FLUID CONTROL APPARATUS

(71) Applicant: HORIBA STEC, Co., Ltd., Kyoto (JP)

(72) Inventor: Kazuya Shakudo, Kyoto (JP)

(73) Assignee: HORIBA STEC, Co., Ltd., Kyoto (JP)

( * ) Notice: Subject to any disclaimer, the term of this patent is extended or adjusted under 35 U.S.C. 154(b) by 135 days.

(21) Appl. No.: 17/210,806

(22) Filed: Mar. 24, 2021

(65) Prior Publication Data

US 2021/0318699 A1   Oct. 14, 2021

(30) Foreign Application Priority Data

Apr. 9, 2020 (JP) .............................. JP2020-070263
Aug. 5, 2020 (JP) .............................. JP2020-133404

(51) Int. Cl.
*G05D 7/06* (2006.01)
*F16K 37/00* (2006.01)

(52) U.S. Cl.
CPC ....... *G05D 7/0652* (2013.01); *F16K 37/0041* (2013.01)

(58) Field of Classification Search
CPC .......................... G05D 7/0652; F16K 37/0041
USPC ................................................ 137/485–492.5
See application file for complete search history.

(56) References Cited

U.S. PATENT DOCUMENTS

| | | | | |
|---|---|---|---|---|
| 6,035,893 A * | 3/2000 | Ohmi | ................. | F15B 13/0825 137/884 |
| 7,225,835 B2 * | 6/2007 | Vu | ....................... | F16K 27/003 137/884 |
| 8,365,762 B1 * | 2/2013 | Trotter | ..................... | B64D 1/18 91/363 R |
| 9,188,990 B2 * | 11/2015 | Yasuda | ..................... | G01F 5/00 |
| 9,494,946 B2 * | 11/2016 | Yasuda | ................ | G05D 7/0617 |
| 2007/0205384 A1 * | 9/2007 | Kurosawa | ........... | F15B 13/0889 137/455 |
| 2012/0180876 A1 * | 7/2012 | Hayashi | .................... | G01F 1/88 137/486 |
| 2020/0208656 A1 * | 7/2020 | Horiguchi | ................ | G01F 1/36 |

FOREIGN PATENT DOCUMENTS

| | | |
|---|---|---|
| JP | 2014032635 A | 2/2014 |
| WO | 2011040270 A1 | 4/2011 |

* cited by examiner

*Primary Examiner* — Angelisa L. Hicks
(74) *Attorney, Agent, or Firm* — Alleman Hall Creasman & Tuttle LLP

(57) ABSTRACT

A fluid control apparatus includes a block elongated in a longitudinal direction and having a predetermined width, an internal flow channel formed inside the block so as to extend in the longitudinal direction, a first control valve mounted on the block, a second control valve mounted on the block at a position downstream of the first control valve. In the fluid control apparatus, the internal flow channel has a first outflow channel connected to a first outlet of the first control valve through which a fluid flows out thereof and also has a second inflow channel connected to a second inlet of the second control valve through which the fluid flows thereinto. In addition, the first outflow channel and the second inflow channel are disposed so as to overlap each other at one point as viewed in the width direction through the block.

16 Claims, 8 Drawing Sheets

FLUID CONTROL APPARATUS

BACKGROUND OF THE INVENTION

Field of the Invention

The present invention relates to a fluid control apparatus that controls the flow rate and pressure of a fluid, such as a gas.

Description of the Related Art

Mass flow controllers are used to control the flow rate of a gas, for example, in a semiconductor manufacturing process. A known mass flow controller includes a block having an internal flow channel formed therein and fluid control instruments, such as pressure sensors and control valves, that are mounted on the block. The block is shaped like a cuboid elongated in the longitudinal direction and having a predetermined width so that multiple mass flow controllers can be arrayed compactly (see International Publication No. 2011/040270).

For example, the width of the block is standardized to 10 mm. Multiple fluid control instruments each having substantially the same width as that of the block are arrayed in the longitudinal direction on a longitudinally extending mounting surface of the block.

Mass flow controllers are desired to be not only compact but also capable of providing a flow rate larger than before. The maximum flow rate of a mass flow controller is limited to a flow rate that a control valve can handle. Accordingly, for example, a mass flow controller disclosed by Japanese Unexamined Patent Application Publication No. 2014-32635 has a block in which two internal flow channels are formed side by side widthwise, and two control valves are disposed at respective internal flow channels, which makes it possible to double the flow rate.

With such a configuration, however, two fluid control instruments, such as control valves, also need to be disposed side by side in the width direction of the block. In this case, even though the maximum flow rate can be increased, it may be difficult to reduce the size of the mass flow controller.

SUMMARY OF THE INVENTION

Accordingly, it is an object of the present invention to provide a fluid control apparatus that can provide a larger maximum flow rate compared with the known configuration while the width of the apparatus is prevented from increasing.

A fluid control apparatus according to an aspect of the present invention includes a block elongated in a longitudinal direction and having a predetermined width, an internal flow channel formed inside the block so as to extend in the longitudinal direction, a first control valve mounted on the block, a second control valve mounted on the block at a position downstream of the first control valve. In the fluid control apparatus, the internal flow channel has a first outflow channel connected to a first outlet of the first control valve through which a fluid flows out thereof and also has a second inflow channel connected to a second inlet of the second control valve through which the fluid flows thereinto. In addition, the first outflow channel and the second inflow channel are disposed so as to overlap each other at one point as viewed in the width direction through the block.

With this configuration, the first control valve and the second control valve can be arrayed in the longitudinal direction. The width of the block can be thereby reduced, while the fluid can flow out of these control valves into a confluent line. Accordingly, using two control valves can substantially double the maximum flow rate, while the fluid control apparatus remains compact widthwise.

In the fluid control apparatus, the block may have a mounting surface on which fluid control instruments are mounted and may also have a protrusion protruding to a predetermined extent from the mounting surface. In addition, one of the first control valve and the second control valve may be mounted on the mounting surface. With this configuration, even if the width of the block is not large, the first outflow channel and the second inflow channel can be easily disposed inside the block in a skew manner so as not to interfere with each other.

In the fluid control apparatus, the second control valve may be disposed at the protrusion. With this configuration, the length of the internal flow channel in the block can be reduced, which leads to a reduction in the volume of the internal flow channel to improve control responsiveness. In addition, in the case in which the fluid is introduced from an end surface of the block or from a surface opposite to the mounting surface, it is easier to reduce the length of a channel for introducing the fluid to the first control valve disposed at an upstream position.

In the fluid control apparatus, the first control valve may have a first valve block having a first contact surface to be in contact with a surface of the block. A first inlet through which the fluid flows into the first valve block and the first outlet through which the fluid flows out of the first valve block may be open at the first contact surface. In addition, the second control valve may have a second valve block having a second contact surface to be in contact with the surface of the block. The second inlet through which the fluid flows into the second valve block and a second outlet through which the fluid flows out of the second valve block may be open at the second contact surface. Accordingly, the first outflow channel and the second inflow channel can be easily disposed in a skew manner while the width of the block is reduced. In addition, each control valve can be disposed entirely outside the block, which eliminates the necessity of forming a recess or the like in the block for accommodating part of the control valve. As a result, it is easier to provide a space in the block for forming the internal flow channel, which enables the first outflow channel and the second inflow channel to be disposed more freely.

In the fluid control apparatus, the first control valve and the second control valve may have a width equal to that of the block. This can lead to a compact fluid control apparatus that can handle a large flow rate with the block having a minimum width.

In the fluid control apparatus, the internal flow channel may have a confluent channel through which the fluid coming out of the first control valve and the second control valve flows and may also have a second outflow channel that connects between the confluent channel and a second outlet of the second control valve through which the fluid flows out thereof. A downstream portion of the first outflow channel may be connected to the confluent channel. The fluid control apparatus may further include a flow rate sensor that measures a flow rate of the fluid flowing through the confluent channel and a fluid controller that controls at least one of the first control valve and the second control valve in response at least to the flow rate measured by the flow rate sensor. With this configuration, the fluid control apparatus can control the total flow rate of the fluid that has passed through the first control valve and the second control valve precisely to a desired value.

In the fluid control apparatus, the internal flow channel may have a first inflow channel connected to a first inlet of the first control valve through which the fluid flows thereinto and may also have a before-branch flow channel of which a downstream portion is connected to the first inflow channel and the second inflow channel. In addition, the fluid control apparatus may further include a flow rate sensor that measures a flow rate of the fluid flowing through the before-branch flow channel and a fluid controller that controls at least one of the first control valve and the second control valve in response at least to the flow rate measured by the flow rate sensor. With this configuration, the first control valve and the second control valve together can achieve a desired flow rate.

In the fluid control apparatus, the fluid controller may have an opening control unit that controls an opening of one of the first control valve and the second control valve so as to cause the fluid to flow at a target-share flow rate that is determined by dividing a set flow rate by a predetermined number of times. The fluid controller may also have a flow rate feedback control unit that controls the other one of the first control valve and the second control valve so as to decrease a deviation between the set flow rate and the flow rate measured by the flow rate sensor. With this configuration, the fluid control apparatus enables the fluid to flow precisely at a desired large flow rate while preventing deterioration of the control performance caused by interference in fluid control between first control valve and the second control valve.

In the fluid control apparatus, the opening control unit may have a target opening calculation unit that calculates a target opening corresponding to the target-share flow rate on a basis of a pressure of the fluid measured at a point upstream of the first control valve. The opening control unit may also have a voltage control unit that applies a voltage corresponding to the target opening to the other one of the first control valve and the second control valve. With this configuration, even if the supply pressure fluctuates, the target opening calculation unit can control one of the control valves to cause the fluid to flow at a flow rate close to the target-share flow rate, which thereby reduces the burden of the other control valve that is controlled by the flow rate feedback control unit.

In the fluid control apparatus, the target-share flow rate may be set to be one-half of the set flow rate. Accordingly, the first control valve and the second control valve can provide approximately the same flow rate, and the fluid control apparatus as a whole can approximately double the maximum flow rate compared with the known configuration.

In the fluid control apparatus, the fluid controller may have a synchronization control unit that controls the opening of the first control valve and the opening of the second control valve in synchronization with each other. With this configuration, the first control valve and the second control valve together can provide a desired flow rate using a simple control rule.

In the fluid control apparatus, the first control valve and the second control valve may be of a same type. In addition, the synchronization control unit may apply an identical voltage to the first control valve and to the second control valve so as to decrease a deviation between a set flow rate and the flow rate measured by the flow rate sensor. With this configuration, the first control valve and the second control valve can operate similarly with a simple control rule, and even with disturbance, the fluid control apparatus can maintain the output at the set flow rate.

In the fluid control apparatus, the fluid controller may have a flow rate feedback control unit that controls one of the first control valve and the second control valve so as to decrease a deviation between a set flow rate and the flow rate measured by the flow rate sensor. The fluid controller may also have a valve-abnormality detection unit configured to detect an abnormality in the first control valve and the second control valve. In addition, the fluid controller may have a valve-control switching unit that causes the flow rate feedback control unit to control the other one of the first control valve and the second control valve when the valve-abnormality detection unit detects an abnormality in the one of the first control valve and the second control valve that is being controlled by the flow rate feedback control unit. With this configuration, the fluid control apparatus causes one of the first control valve and the second control valve to perform flow rate control in normal operation. When an abnormality occurs in the control valve performing the flow rate control, the fluid control apparatus causes the other control valve to resume the flow rate control. Accordingly, the fluid control apparatus can recover from the abnormality by itself.

This eliminates the necessity of an operator performing, for example, a special recovery and restoration operation. Even if an abnormality occurs to the control valve performing the flow rate control, the fluid control apparatus can automatically resume the flow rate control using the other control valve. The fluid control apparatus with a self-reset and self-recovery function can continue the flow rate control even if one of the control valves breaks down, which can improve the reliability of the flow rate control. Moreover, for example, if the first control valve and the second control valve are normally open valves, the control valve that has performed the flow rate control becomes full open at the break-down, which tends not to disturb the flow rate control of the other control valve.

In the fluid control apparatus, the flow rate feedback control unit may initially control the second control valve, and the valve-control switching unit may cause the flow rate feedback control unit to control the first control valve when the valve-abnormality detection unit detects an abnormality in the second control valve. This reduces the distance between the measurement point by the flow rate sensor and the flow rate control point by the control valve and thereby improves control responsiveness in normal operation in which no abnormality occurs.

In order to detect an abnormality of each control valve, the valve-abnormality detection unit may be configured to detect an abnormality of insulation of the first control valve and the second control valve on a basis of a voltage applied thereto.

Alternatively, in order to detect an abnormality of each control valve, the valve-abnormality detection unit may be configured to detect an abnormality in the first control valve and the second control valve on a basis of an absolute value of a deviation between the set flow rate and the flow rate measured by the flow rate sensor.

According to the fluid control apparatus, the first outflow channel and the second inflow channel are disposed in the block so as to overlap each other at one position as viewed in the width direction through the block. Accordingly, the first control valve and the second control valve can be arrayed on the block in the longitudinal direction, which enables the width of the block to be reduced while the fluid is able to flow out of each control valve into the confluent channel. Thus, the fluid control apparatus can be formed compactly while increasing the maximum flow rate compared with the known configuration.

DESCRIPTION OF THE PREFERRED EMBODIMENTS

A fluid control apparatus 100 according to a first embodiment will be described with reference to FIGS. 1A to 3.

The fluid control apparatus 100 is used, for example, in a semiconductor manufacturing process, to supply fluids, or specifically various types of gases, to a chamber at a desirable set flow rate. A gas supply system is formed typically by arraying multiple fluid control apparatuses 100 side by side in the width direction.

Figure 1A:
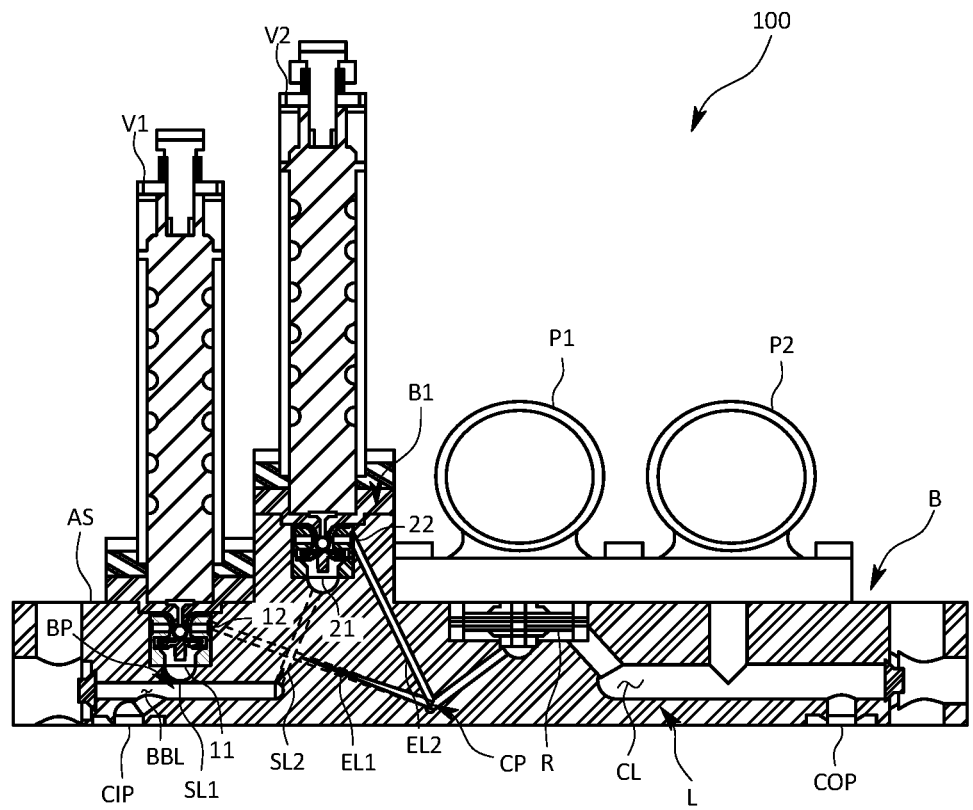
FIG. 1A and FIG. 1B are diagrams illustrating a hardware configuration of a fluid control apparatus according to a first embodiment of the present invention.
Figure 1B:
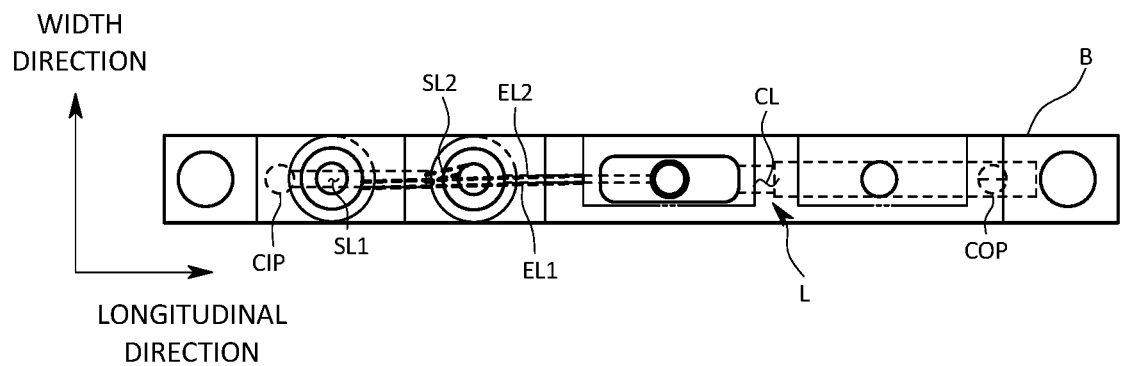
Figure 2:
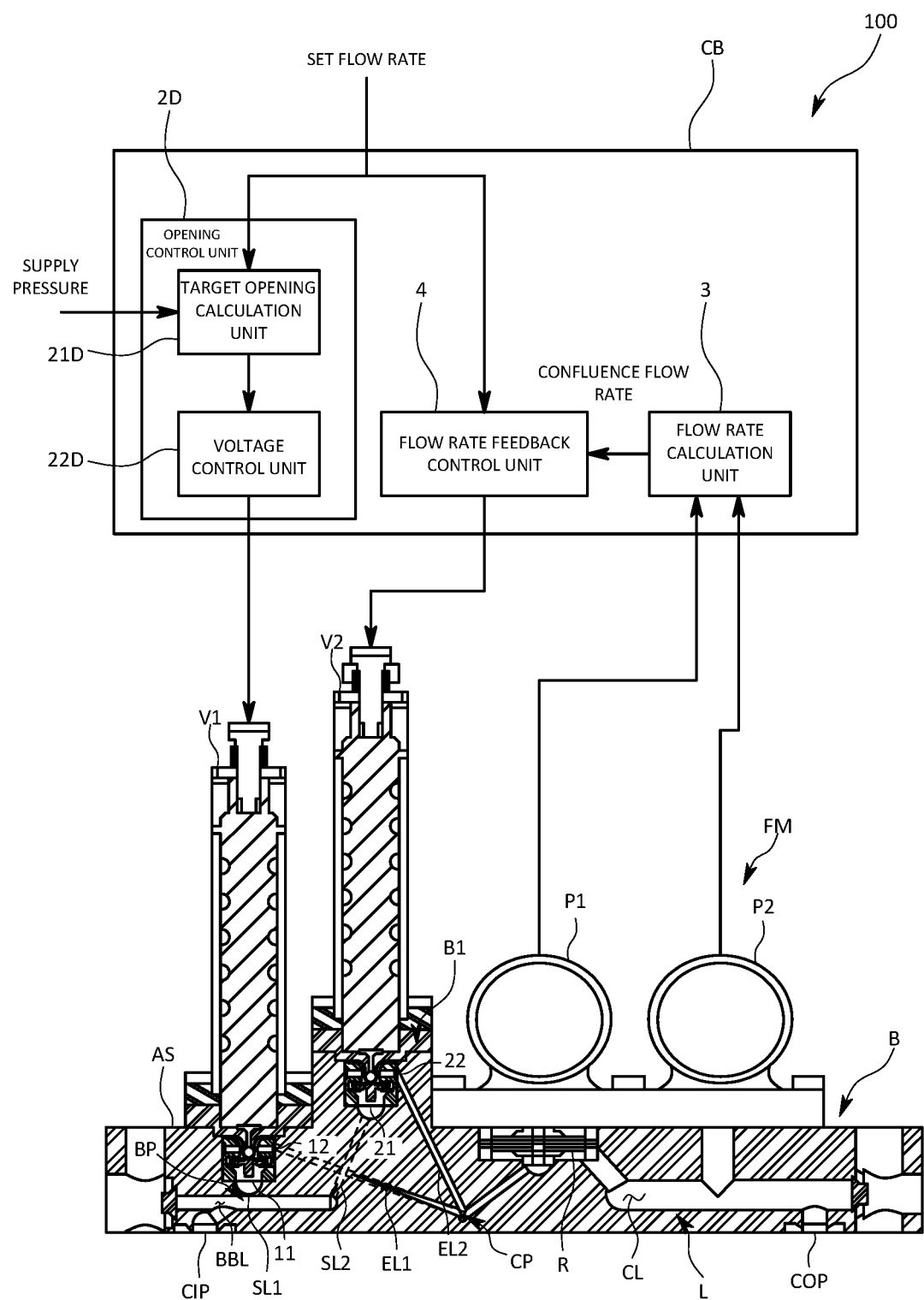
FIG. 2 is a diagram illustrating a configuration of a fluid controller of the fluid control apparatus according to the first embodiment.

As illustrated in FIGS. 1A, 1B, and 2, the fluid control apparatus 100, which is elongated in the longitudinal direction, includes a block B, a first control valve V1, a second control valve V2, a flow rate sensor FM, and a fluid controller CB. The block B has an internal flow channel L formed inside through which a gas flows from one end to the other. The first control valve V1 and the second control valve V2 are mounted on the block B. The flow rate sensor FM is a pressure sensing device that measures the flow rate of the confluent gas that has passed through the first control valve V1 and the second control valve V2. The fluid controller CB controls the first control valve V1 and the second control valve V2 in response to the measurement results of the flow rate sensor FM. Each component is described in detail below.

As illustrated in FIGS. 1A and 1B, the block B is an elongated cuboid, and a protrusion B1 is formed on one surface of the block B at a central region thereof. The protrusion B1 is also shaped like a cuboid. The surface having the protrusion B1 is a mounting surface AS on which the first control valve V1, a first pressure sensor P1, a second pressure sensor P2 are mounted. The first pressure sensor P1 and the second pressure sensor P2 form the flow rate sensor FM. The control valves and the pressure sensors are fluid control instruments. The second control valve V2 is mounted at the protrusion B1. To put it another way, the first control valve V1, the second control valve V2, the first pressure sensor P1, and the second pressure sensor P2 are disposed on the block B in the order from the upstream to the downstream in the internal flow channel L. As illustrated in FIG. 1B, the block B has a constant width that is substantially equal to the widths of the first control valve V1, the second control valve V2, the first pressure sensor P1, and the second pressure sensor P2.

For example, the first control valve V1 and the second control valve V2 are piezo valves of the same type and size. Each has a cylindrically shaped valve structure formed of a valve seat and a valve plug, and the valve structure is inserted in a cylindrically shaped recess formed in the block B at the mounting surface AS and at the protrusion B1. A piezo actuator for driving the valve plug is disposed at the valve structure so as to protrude outward therefrom. An inlet is formed at the bottom surface of the valve structure. A gas flows into the control valve through the inlet and passes through the gap between the valve plug and the valve seat. The gas subsequently flows downstream through an outlet formed at a side surface of the valve structure. In the following description, the inlet and the outlet of the first control valve V1 are denoted by a first inlet 11 and a first outlet 12, and the inlet and the outlet of the second control valve V2 are denoted by a second inlet 21 and a second outlet 22.

The first pressure sensor P1 and the second pressure sensor P2 are pressure sensors of the same type and size. Each pressure sensor is formed of a cuboid-like fixing portion to be attached to the mounting surface AS and of a sensor portion that is positioned above the fixing portion and is shaped like a flat disc. A pressure sensing surface is formed inside the sensor portion so as to extend perpendicularly to the mounting surface AS. The first pressure sensor P1 is mounted on the block B in such a manner that the bottom surface of the fixing portion presses a laminar flow element R that is a fluid resistor accommodated in the recess formed at the mounting surface AS. The laminar flow element R is formed by stacking multiple laminar flow plates each having micro flow channels. When the gas passes between the laminar flow plates, a differential pressure before and after passing the laminar flow element R is created. A through hole is formed at a central portion of the laminar flow element R at a position before the laminar flow plates so as to introduce the gas into the first pressure sensor P1. The first pressure sensor P1 thereby measures the pressure of the gas upstream of the laminar flow element R. The second pressure sensor P2 measures the pressure of the gas that has passed the laminar flow element R.

An input port CIP for introducing the gas into the internal flow channel L is formed at the bottom surface of the block B, which is a surface opposite to the mounting surface AS. An output port COP is also formed at the bottom surface. The gas that has passed through the first control valve V1 and the second control valve V2 flows out of the internal flow channel L through the output port COP.

A portion of the internal flow channel L near one end of the block B is formed as two flow channels that extends side by side. The first control valve V1 and the second control valve V2 are disposed at respective flow channels. A portion of the internal flow channel L near the other end of the block B is formed as a single confluent channel CL into which the gas coming out of the first control valve V1 and the second control valve V2 flows together.

Figure 3:
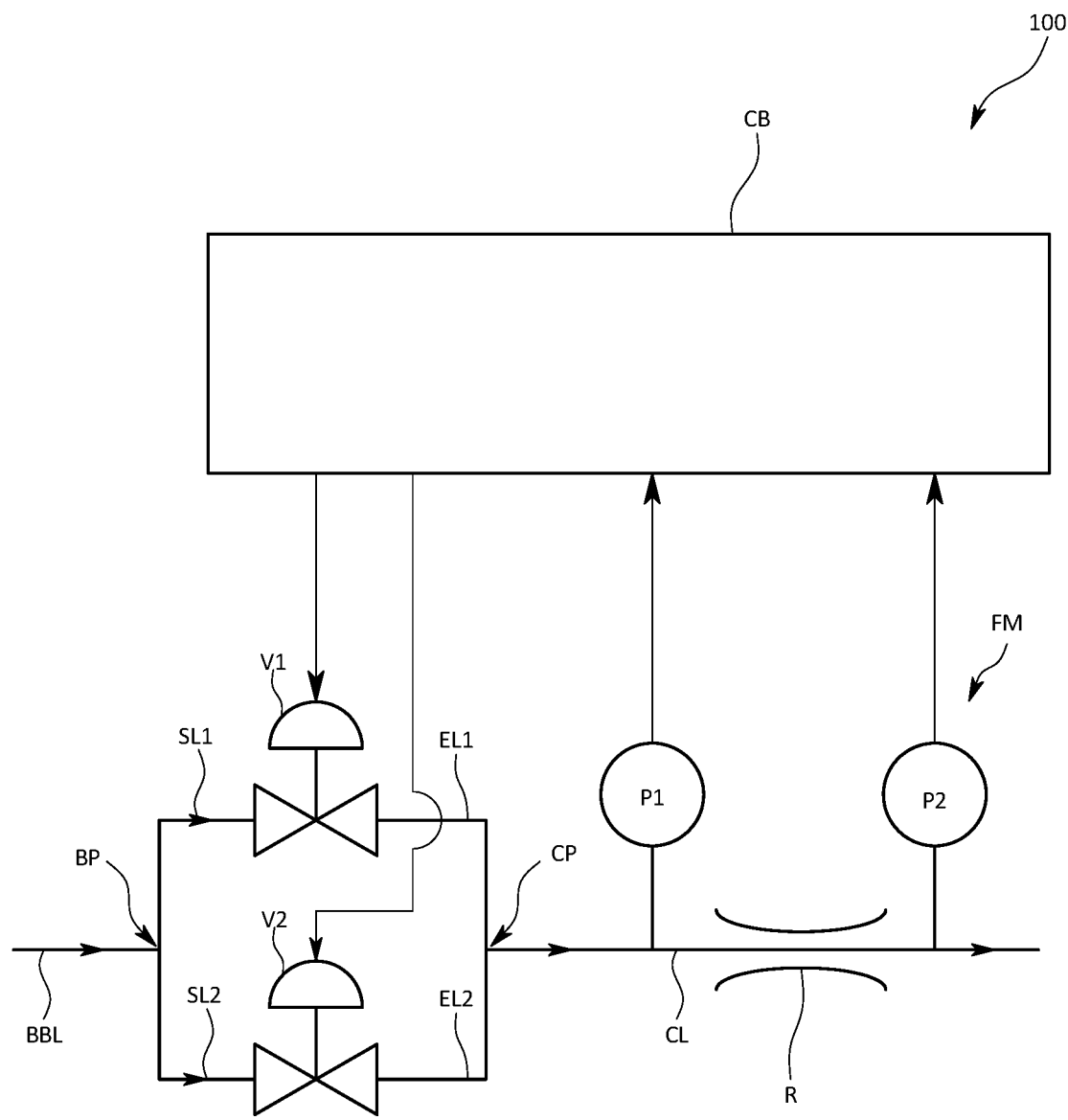
FIG. 3 is a diagram schematically illustrating a fluid circuit of the fluid control apparatus according to the first embodiment.

In other words, the fluid circuit as illustrated in FIG. 3 is formed by mounting the fluid control instruments onto the single block B. More specifically, as illustrated in FIGS. 1A, 1B and 3, the internal flow channel L further includes a before-branch flow channel BBL, a first inflow channel SL1, a second inflow channel SL2, a first outflow channel EL1, and a second outflow channel EL2. The before-branch flow channel BBL is a flow channel into which a fluid flows from the input port CIP. The first inflow channel SL1 is branched from a branch point BP located at the downstream end of the before-branch flow channel BBL and is connected to the first inlet 11 of the first control valve V1. The second inflow channel SL2 is branched from the branch point BP located at the downstream end of the before-branch flow channel BBL and is connected to the second inlet 21 of the second control valve V2. The first outflow channel EL1 connects between the first outlet 12 of the first control valve V1 and a confluence point CP that is the upstream end of the confluent channel CL. The second outflow channel EL2 connects between the second outlet 22 of the second control valve V2 and the confluence point CP that is the upstream end of the confluent channel CL. The second inflow channel SL2 and the first outflow channel EL1 extend so as to form skew lines inside the block B.

As illustrated in FIG. 1A, the second inflow channel SL2 and the first outflow channel EL1 are disposed so as to overlap each other at one point when these channels are viewed through the block B in the width direction. In other words, a portion of the first outflow channel EL1 and a portion of the second inflow channel SL2 form a cross as viewed in the width direction. To put it more specifically, the first inflow channel SL1 is formed through a central portion of the block B in the width direction, whereas the second inflow channel SL2 extends obliquely from the central portion of the block B toward a deeper position in the depth direction in FIG. 1A. Since the second control valve V2 is disposed on the protrusion B1, the second inflow channel SL2 extends toward a deeper position in the depth direction in FIG. 1A and simultaneously extends from a position near the bottom surface of the block B toward the mounting surface AS. In other words, the gas flows through the second inflow channel SL2 in the block B toward a deeper position in the depth direction in the figure.

On the other hand, the first outflow channel EL1 extends from a shallower position in the depth direction in FIG. 1A toward the central portion of the block B in the width direction and simultaneously extends from a position near the mounting surface AS toward the bottom surface of the block B. The first outflow channel EL1 and the second outflow channel EL2 join at the end of the confluent channel located upstream of the laminar flow element R.

Next, the fluid controller CB will be described with reference to FIG. 2.

The fluid controller CB is a control circuit formed of a CPU, a memory, an I/O channel, an A/D converter, a D/A converter, and other analog and digital circuits. The CPU executes a program stored in the memory and coordinates operation of devices, thereby causing the fluid controller CB to function as at least an opening control unit 2D, a flow rate calculation unit 3, and a flow rate feedback control unit 4, as illustrated in FIG. 2. The fluid controller CB of the present embodiment controls the first control valve V1 and the second control valve V2 so as to cause a substantially equal amount of the gas to pass through the first control valve V1 and the second control valve V2 and so as to cause the gas to flow in the confluent channel CL at a flow rate substantially equal to a set flow rate set in advance by a user.

Accordingly, the first control valve V1 and the second control valve V2 can output the substantially same amount of the gas, which can achieve a maximum flow rate of twice as much compared with the case of using a single control valve. Each component is described in detail below.

The opening control unit 2D controls the opening of the first control valve V1 in accordance with the set flow rate and a supply pressure. The supply pressure is measured by a supply pressure sensor (not illustrated) disposed at a flow channel connected to the input port CIP of the fluid control apparatus 100. The opening control unit 2D controls the opening so as to cause the gas to flow through the first control valve V1 at a flow rate of one-half of the set flow rate. Here, the flow rate sensor FM measures a confluence flow rate, which is a flow rate of the gas flowing through the confluent channel CL, but information on the confluence flow rate is not fed back to the opening control unit 2D.

More specifically, the opening control unit 2D includes a target opening calculation unit 21D that calculates the target opening of the first control valve V1 in accordance with the set flow rate and the supply pressure. The opening control unit 2D also includes a voltage control unit 22D that applies a voltage to the first control valve V1. Here, the applied voltage corresponds to the target opening calculated by the target opening calculation unit 21D.

The target opening calculation unit 21D retains information on the conductance of the first control valve V1 and calculates the target opening that can achieve the flow rate of one-half of the set flow rate at a given supply pressure on the basis of the conductance.

The voltage control unit 22D retains information on voltage-opening characteristics of the first control valve V1 and applies the voltage corresponding to the target opening to the first control valve V1.

Accordingly, the first control valve V1 is controlled in an open-loop manner. In other words, the flow rate of the first control valve V1 is determined in accordance with the supply pressure and the set flow rate, and information on the resultant flow rate is not fed back to the control of the first control valve V1. The flow rate of the gas output by the first control valve V1 becomes close to one-half of the set flow rate, but deviation of flow rate remains uncorrected.

The flow rate calculation unit 3 calculates the confluence flow rate, which is a flow rate of the gas flowing in the confluent channel CL, on the basis of a first pressure measured by the first pressure sensor P1 and a second pressure measured by the second pressure sensor P2. The calculation formula adopted by the flow rate calculation unit 3 may be a known one, for example, based on the differential pressure between the first pressure and the second pressure or based on the difference between the square of the first pressure and the square of the second pressure.

The flow rate feedback control unit 4 controls the opening of the second control valve V2 so as to decrease the deviation of the confluence flow rate calculated by the flow rate calculation unit 3 with respect to the set flow rate. In other words, the fluid control apparatus 100 is configured to control the second control valve V2 so as to reduce both of the deviations of flow rate caused by the first control valve V1 and the second control valve V2.

In the fluid control apparatus 100 configured as described above, the first outflow channel EL1 through which the gas flows out of the first control valve V1 and the second inflow channel SL2 through which the gas flows into the second control valve V2 are disposed inside the block B so as to form skew lines and overlap each other at one point as viewed in the width direction. Accordingly, the fluid coming out of the first control valve V1 and the second control valve V2 can flow into the confluent channel CL while the width of the block B is reduced by arraying the first control valve V1 and the second control valve V2 in the longitudinal direction. Using two control valves can substantially double the maximum flow rate compared with the known configuration while the fluid control apparatus 100 can remain compact widthwise.

The fluid controller CB controls the opening of the first control valve V1 in response to the supply pressure, in which the flow rate is controlled in an open-loop manner. On the other hand, the flow rate of the second control valve V2 is controlled in a closed loop manner, in which the confluence flow rate measured by the flow rate sensor FM is fed back to the control. In other words, only the second control valve V2 is subject to the flow rate feedback control, which prevents operation of two control valves from interfering with each other.

In addition, the first control valve V1 is controlled to open so as to cause the gas to flow at the flow rate of one-half of the set flow rate. Accordingly, the gas flows through the first control valve V1 and the second control valve V2 at substantially equal flow rates. This enables accurate control of the two valves to output a maximum flow rate of twice as much compared with the case where a single control valve controls the flow rate of the gas.

Next, the fluid control apparatus 100 according to a second embodiment of the present invention will be described with reference to FIGS. 4A and 4B. Note that components corresponding to those described in the first embodiment are denoted by the same reference symbols.

The fluid control apparatus 100 according to the second embodiment has such a structure that the valve plugs and the valve seats of the first control valve V1 and the second control valve V2 are not inserted in the block B and that the first control valve V1 and the second control valve V2 can be detached individually from the block B.

More specifically, the first control valve V1 includes a first valve block VB1 in which a valve plug and a valve seat are formed. The bottom surface of the first valve block VB1 is attached to the mounting surface AS of the block B, and the first control valve V1 thereby communicates with the internal flow channel L. The bottom surface of the first valve block VB1 is referred to as a connection surface CS. The first inlet 11 through which the fluid or the gas flows in and the first outlet 12 through which the gas flows out open at the connection surface CS. As illustrated in FIG. 4A, when the connection surface CS is attached to the mounting surface AS, the first inlet 11 is brought into communication with the downstream-end opening of the first inflow channel SL1 at the mounting surface AS, and the first outlet 12 is brought into communication with the upstream-end opening of the first outflow channel EL1 at the mounting surface AS. As illustrated in FIG. 4B, the first outlet 12 is disposed at a position shifted in the width direction with respect to the center of the first inlet 11 and is connected to the first outflow channel EL1 that extends obliquely in the block B.

The second control valve V2 has a structure similar to that of the first control valve V1. The second control valve V2 includes a second valve block VB2 in which a valve plug and a valve seat are formed. The bottom surface of the second valve block VB2 is attached to the mounting surface AS of the block B, and the second control valve V2 thereby communicates with the internal flow channel L. The bottom surface of the second valve block VB2 is referred to as a connection surface CS. The second inlet 21 through which the fluid or the gas flows in and the second outlet 22 through which the gas flows out open at the connection surface CS. As illustrated in FIG. 4A, when the connection surface CS is attached to the mounting surface AS, the second inlet 21 is brought into communication with the downstream-end opening of the second inflow channel SL2 at the mounting surface AS, and the second outlet 22 is brought into communication with the upstream-end opening of the second outflow channel EL2 at the mounting surface AS. As illustrated in FIG. 4B, the second outlet 22 is disposed at a position shifted in the width direction toward the center of the block B with respect to the center of the first outlet 12. The second outflow channel EL2 connected to the second outlet 22 is formed so as to extend in the height direction of the block B and cross the first outflow channel EL1 as viewed in the width direction.

Figure 4A:
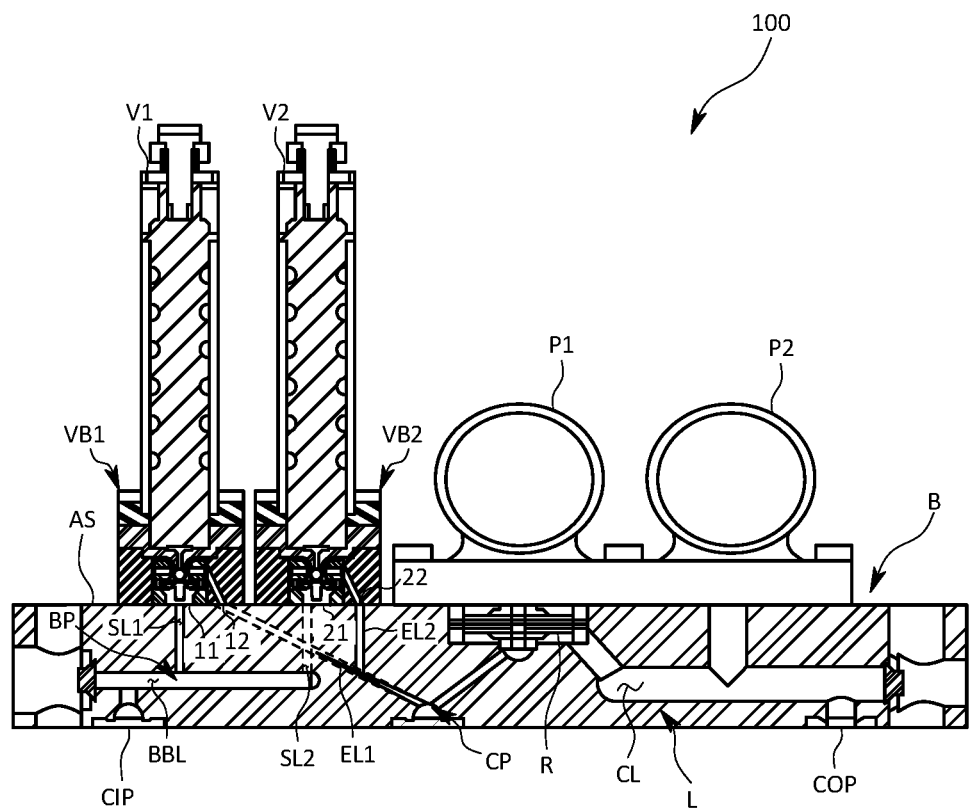
FIG. 4A and FIG. 4B are diagrams illustrating a hardware configuration of a fluid control apparatus according to a second embodiment of the present invention.
Figure 4B:
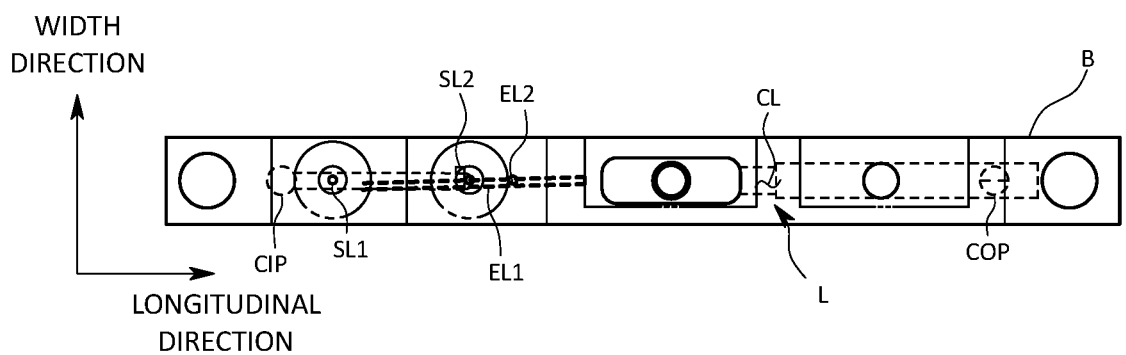

The second inflow channel SL2 extends obliquely in the width direction from the central portion of the block B toward a deeper position in the depth direction in FIG. 4A. The second inflow channel SL2 is disposed in a skew manner with respect to the first outflow channel EL1 that extends obliquely toward a shallow position in the depth direction in FIG. 4A. As illustrated in FIG. 4A, the first outflow channel EL1 and the second inflow channel SL2 are disposed so as to overlap each other at one point when these channels are viewed through the block B in the width direction.

According to the fluid control apparatus 100 of the second embodiment configured as above, it is not necessary to form recesses at the mounting surface AS of the block B for accommodating portions of the first control valve V1 and the second control valve V2. The first control valve V1 and the second control valve V2 can be entirely disposed outside of the block B and also can be detached. This can provide the block B with a larger space therein for forming the first inflow channel SL1, the second inflow channel SL2, the first outflow channel EL1, and the second outflow channel EL2. Accordingly, it becomes easier to dispose the first outflow channel EL1 and the second inflow channel SL2 in a skew manner even using a simple structure.

Figure 5:
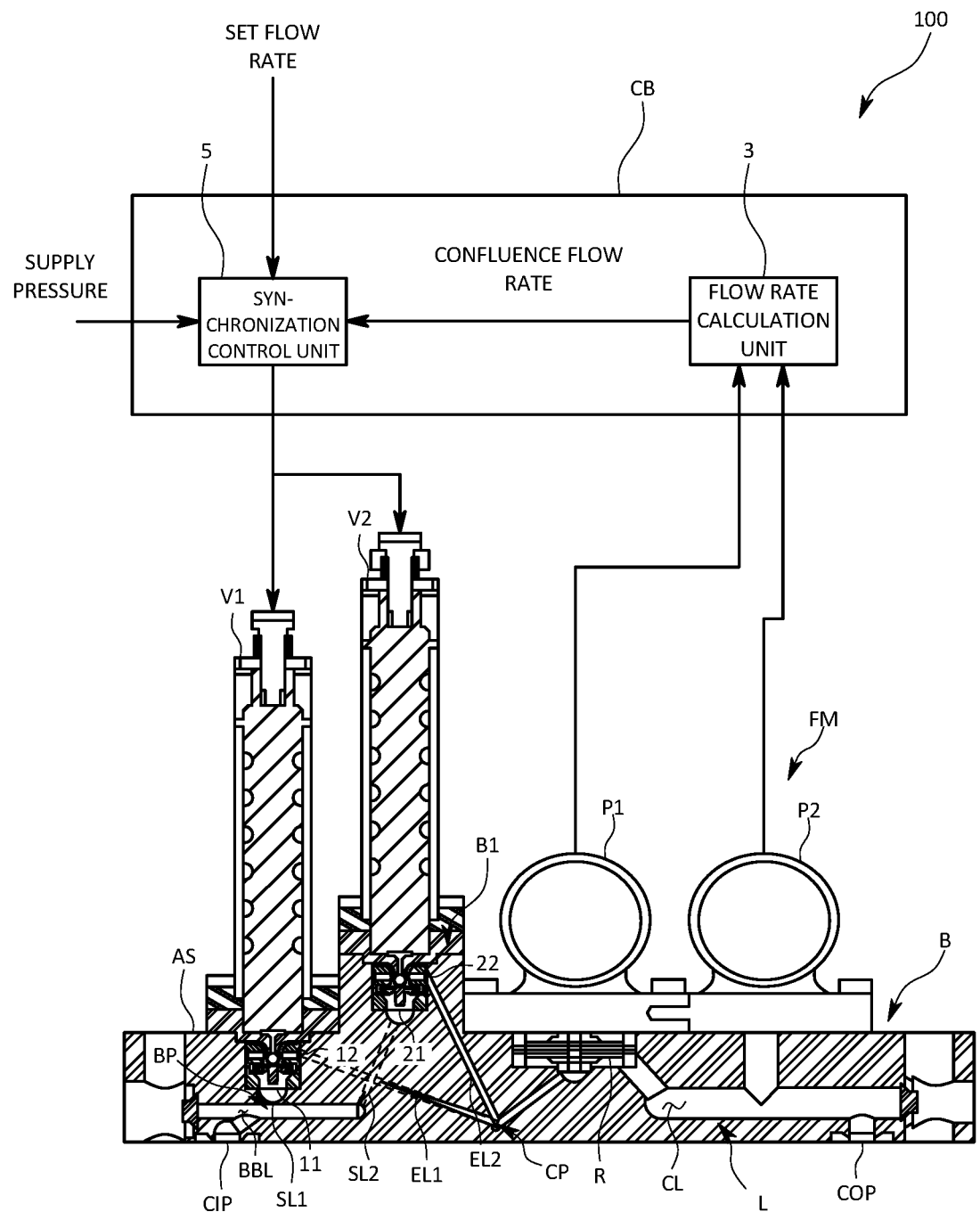
FIG. 5 is a diagram illustrating a configuration of a fluid control apparatus according to a third embodiment of the present invention.

Next, the fluid control apparatus 100 according to a third embodiment of the present invention will be described with reference to FIG. 5. Note that components corresponding to those described in the first embodiment are denoted by the same reference symbols.

The fluid control apparatus 100 of the third embodiment is different from that of the first embodiment in the configuration of the fluid controller CB. In other words, while the fluid controller CB of the first embodiment controls the first control valve V1 and the second control valve V2 separately using different control rules, the fluid controller CB of the third embodiment changes the opening of the first control valve V1 and the second control valve V2 in a synchronized manner.

The fluid controller CB of the third embodiment includes a synchronization control unit 5 that controls the first control valve V1 and the second control valve V2 to change the opening in synchronization with each other.

The synchronization control unit 5 applies the same voltage to the first control valve V1 and to the second control valve V2 so as to decrease the deviation of the confluence flow rate, which is measured by the flow rate sensor FM, from the set flow rate. Here, the first control valve V1 and the second control valve V2 are valves of the same type and size. Accordingly, application of the same voltage causes these valves to open substantially to the same degree. The synchronization control unit 5 is configured to change the voltage applied to each control valve in accordance with the deviation of the measurement results from the set flow rate in such a manner that substantially the same voltage is applied to each control valve at any given time. For example, the first control valve V1 and the second control valve V2 are connected in parallel to the synchronization control unit 5, and accordingly the voltage applied thereto is always the same. The synchronization control unit 5 is configured to correct the voltage to be applied also in accordance with the supply pressure.

The fluid control apparatus 100 of the third embodiment enables the gas to flow uniformly through the first control valve V1 and the second control valve V2 to achieve precise control at a large flow rate using a simple control rule.

Figure 6:
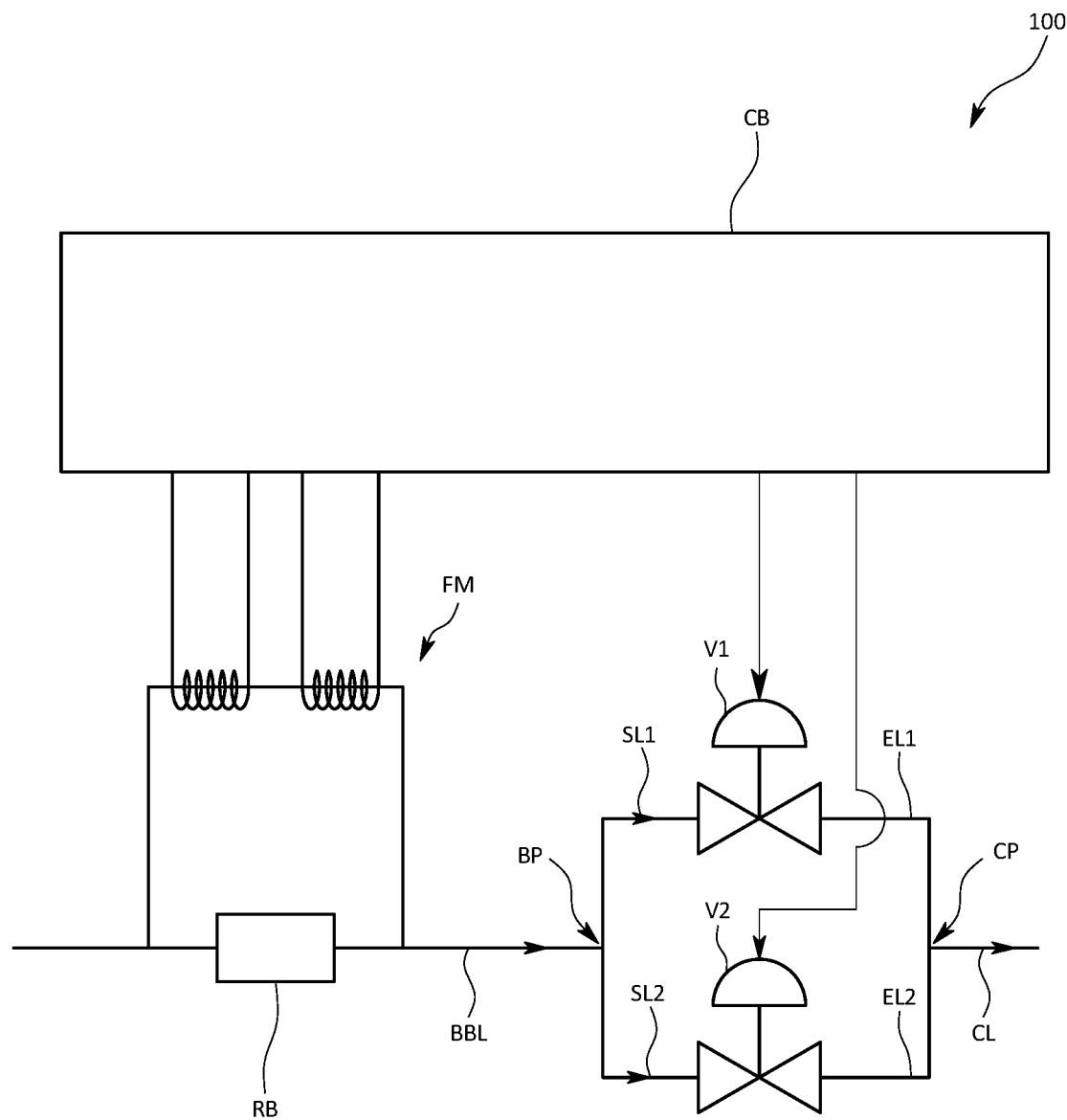
FIG. 6 is a diagram schematically illustrating a fluid circuit of a fluid control apparatus according to a fourth embodiment of the present invention.

Next, the fluid control apparatus 100 according to a fourth embodiment of the present invention will be described with reference to FIG. 6. Note that components corresponding to those described in the first embodiment are denoted by the same reference symbols.

The fluid control apparatus 100 of the fourth embodiment has a flow rate sensor FM disposed at the before-branch flow channel BBL, which is a flow channel disposed upstream of the first and second control valves V1 and V2. This flow rate sensor FM is not a pressure-type flow meter but a thermal-type flow meter. This flow rate sensor FM includes a flow diversion element RB, a thin pipe TP, a first coil C1, and a second coil C2. The flow diversion element RB is a fluid resistor disposed at the before-branch flow channel BBL, and the thin pipe TP is a U-shape bypass that bypasses the flow diversion element RB. The first coil C1 and the second coil C2 disposed downstream of the first coil C1 are wound around the thin pipe TP. For example, the fluid controller CB applies voltages to respective coils C1 and C2 so as to maintain a constant temperature at the coils C1 and C2. The flow rate is calculated in accordance with the difference of the voltages applied to the coils C1 and C2.

The fluid control apparatus 100 of the fourth embodiment can provide advantageous effects similar to those of the fluid control apparatus 100 of the first embodiment.

Next, the fluid control apparatus 100 according to a fifth embodiment of the present invention will be described with reference to FIGS. 7 and 8. Note that components corresponding to those described in the first embodiment are denoted by the same reference symbols.

The fluid control apparatus 100 of the fifth embodiment is configured such that the fluid control apparatus 100 automatically continues the flow rate control even if one of the first control valve V1 and the second control valve V2 stops functioning. In other words, the fluid control apparatus 100 of the present embodiment has a self-reset and self-recovery function in the flow rate control.

The fluid control apparatus 100 of the present embodiment includes a first control valve V1 and a second control valve V2 that are configured to be normally open valves. To put it another way, the first control valve V1 and the second control valve V2 are configured to be full open when a voltage is not applied or when a dielectric breakdown occurs to the piezo actuator. The first control valve V1 and the second control valve V2 are control valves of the same type and having the same control characteristics.

Figure 7:
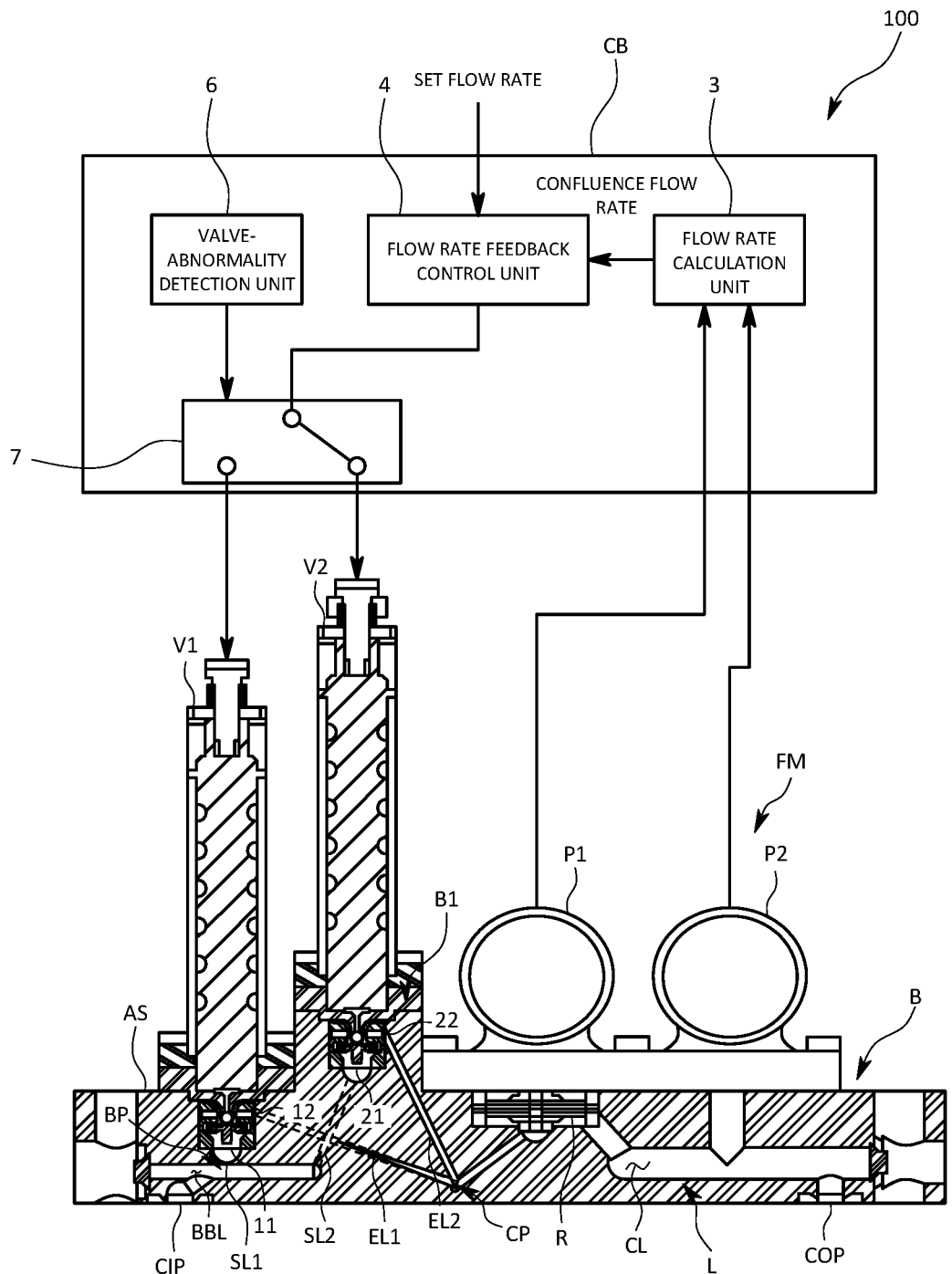
FIG. 7 is a diagram illustrating a configuration of a fluid control apparatus according to a fifth embodiment of the present invention when the fluid control apparatus is in normal operation.

As illustrated in FIG. 7, the fluid controller CB controls the flow rate only using the second control valve V2 during normal operation. As illustrated in FIG. 8, when an abnormality occurs, the fluid controller CB automatically switches to the flow rate control only using the first control valve V1. In normal operation, for example, the opening of the second control valve V2 is changed appropriately, while the first control valve V1 is kept full open.

The fluid controller CB of the present invention is configured to perform functions as the flow rate calculation unit 3, the flow rate feedback control unit 4, a valve-abnormality detection unit 6, and a flow rate control switching unit 7.

The flow rate calculation unit 3 has the same configuration as that of the first embodiment. The flow rate feedback control unit 4 operates with the same basic control rules as those of the first embodiment. The flow rate control switching unit 7, however, can switch the target valves that the flow rate feedback control unit 4 controls. In the present embodiment, the flow rate feedback control unit 4 controls the second control valve V2 in normal operation. In the case of an abnormality, the flow rate feedback control unit 4 is switched to control the first control valve V1.

The valve-abnormality detection unit 6 monitors at least the second control valve V2, which is the target valve controlled by the flow rate feedback control unit 4 in normal operation. In other words, the valve-abnormality detection unit 6 monitors the voltage applied to the second control valve V2 and also monitors the absolute value of the deviation between the set flow rate and the confluence flow rate calculated in the flow rate feedback control unit 4. For example, when the voltage applied to the second control valve V2 drops to a predetermined value or less, the valve-abnormality detection unit 6 determines that a dielectric breakdown has occurred in the piezo actuator. When the absolute value of the difference reaches a predetermined value or more and such condition continues for a predetermined period of time, the valve-abnormality detection unit 6 determines that the second control valve V2 is unable to control the flow rate due to an abnormality occurring to the second control valve V2.

Figure 8:
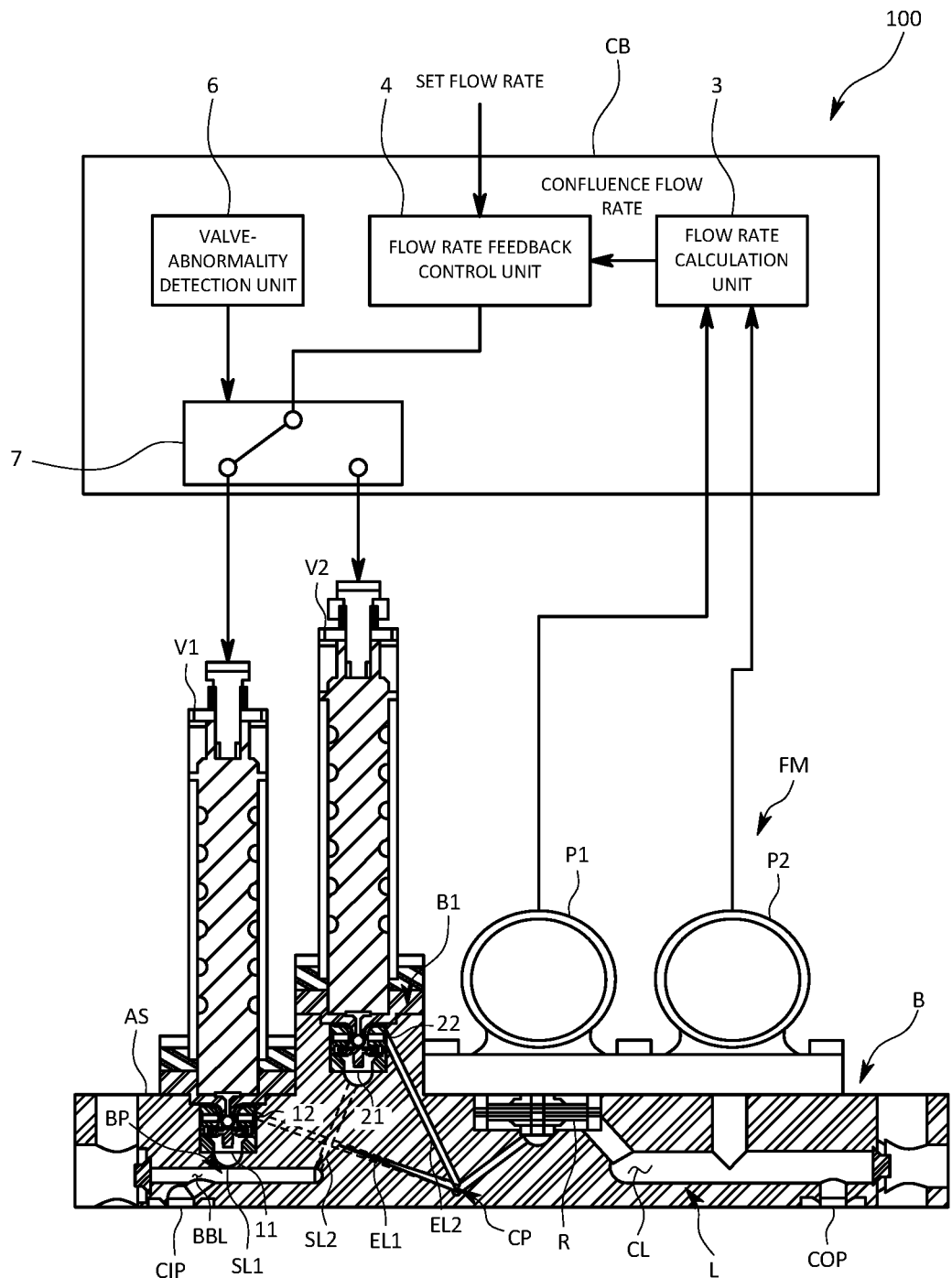
FIG. 8 is a diagram illustrating a configuration of the fluid control apparatus according to the fifth embodiment of the present invention when an abnormality occurs.

As illustrated in FIG. 8, when the valve-abnormality detection unit 6 detects an abnormality of the second control valve V2, the flow rate control switching unit 7 switches the flow rate control from the second control valve V2 to the first control valve V1. In other words, the flow rate feedback control unit 4 applies the voltage only to the first control valve V1 and resumes the flow rate control. In addition, the second control valve V2, which is the normally open valve, becomes full open when the voltage is not applied.

The fluid control apparatus 100 of the fifth embodiment can automatically switch the flow rate control to the first control valve V1 when an abnormality is detected at the second control valve V2 during its operation of the flow rate control. Even if the second control valve V2 cannot control the flow rate nor maintain the set flow rate due to the abnormality, the fluid control apparatus 100 causes the first control valve V1 to control the flow rate and automatically resumes the set flow rate.

After the first control valve V1 resumes the flow rate control, the second control valve V2 remains full open, which minimizes the likelihood of the second control valve V2 building fluid resistance. Accordingly, the first control valve V1 can perform flow rate control with substantially the same conditions as those of the second control valve V2, which enables the fluid control apparatus to control the flow rate consistently in terms, for example, of precision in flow rate control.

The following describes other embodiments.

The block does not necessarily have the protrusion protruding from the mounting surface. In other words, the first control valve and the second control valve may be mounted on the mounting surface at positions of no height difference. Even in this case, the first outflow channel and the second inflow channel can be disposed in a skew manner and can cross each other at one point when these channels are viewed in the width direction.

The position at which the protrusion is disposed is not limited to that described in the above embodiment. For example, the protrusion may be formed at a position at which the first control valve is disposed. The first control valve is thereby disposed at a higher position on the block with respect to the second control valve.

The flow rate sensor is not limited to the one based on a pressure sensing device, but may be a device using a different measurement principle, such as a thermal type, a type using ultrasonic waves, or the like. The fluid flowing through the internal flow channel is not limited to the gas, but may be a liquid.

The target valve that the opening control unit controls is not limited to the first control valve but may be the second control valve. In this case, the flow rate feedback control unit is configured to control the first control valve. The pressure that the opening control unit uses is not limited to the supply pressure. For example, the opening control unit may control the opening of the first control valve or the second control valve in response to the first pressure measured by the first pressure sensor that constitutes the pressure-sensing flow rate sensor.

The opening control unit is not limited to the one that operates so as to achieve a flow rate of one-half of the set flow rate. For example, the opening control unit may control the first control valve or the second control valve so as to achieve a flow rate determined by dividing the set flow rate by a predetermined number of times.

The fluid control apparatus is not limited to the one that controls the flow rate but may be the one that controls the pressure. Even in the case of the fluid control apparatus being the pressure control type, the fluid control apparatus according to the present invention can increase the maximum flow rate compared with the known configuration.

The second inflow channel is not limited to the one branched from the first inflow channel but may be formed so as to connect between the input port and the second inlet. Moreover, two input ports may be formed, and the first inflow channel and the second inflow channel may receive different fluids from different fluid supply sources.

In the fifth embodiment, the fluid control apparatus is configured to cause the second control valve to exclusively control the flow rate in normal operation and to cause the first control valve to exclusively control the flow rate when an abnormality is detected. The fluid control apparatus, however, may be configured such that the first control valve exclusively controls the flow rate in normal operation and the second control valve exclusively controls the flow rate after an abnormality is detected. An operation resumption voltage may be applied to the control valve that does not perform the flow rate control in normal operation so that the control valve can resume operation quickly after switchover. Moreover, the control valve that does not perform the flow rate control in normal operation may perform pressure control, and when an abnormality is detected, the control valve may resume the flow rate control.

In the fluid control apparatus of the fifth embodiment, both the first control valve and the second control valve are configured to be the normally open valves. The first control valve and the second control valve, however, may be normally closed valves, in other words, the first control valve and the second control valve may be closed when a voltage is not applied. Alternatively, one of the first control valve and the second control valve may be the normally open valve, and the other may be the normally closed valve. Even with this configuration of the first and second controls valves, when an abnormality occurs to the valve performing the flow rate control, the fluid control apparatus can automatically resume the flow rate control using the other valve. Accordingly, as is the case for the fifth embodiment, this fluid control apparatus also can perform a self-reset and self-recovery function in flow rate control.

The above-described embodiments may be modified in various ways, and the configurations described in the above embodiments may be combined with one another without departing from the scope of the invention.

What is claimed is:

1. A fluid control apparatus, comprising:
   a block elongated in a longitudinal direction and having a predetermined width;
   an internal flow channel formed inside the block so as to extend in the longitudinal direction;
   a first control valve mounted on the block;
   a second control valve mounted on the block at a position downstream of the first control valve, wherein
   the internal flow channel has
      a first outflow channel connected to a first outlet of the first control valve through which a fluid flows out thereof, and
      a second inflow channel connected to a second inlet of the second control valve through which the fluid flows thereinto, and
   the first outflow channel and the second inflow channel are disposed so as to overlap each other at one point as viewed in the width direction through the block.

2. The fluid control apparatus according to claim 1, wherein
   the block has
      a mounting surface on which fluid control instruments are mounted, and
      a protrusion protruding to a predetermined extent from the mounting surface, and
   one of the first control valve and the second control valve is mounted on the mounting surface.

3. The fluid control apparatus according to claim 2, wherein
   the second control valve is disposed at the protrusion.

4. The fluid control apparatus according to claim 1, wherein
   the first control valve further has a first valve block having a first contact surface to be in contact with a surface of the block and a first inlet through which the fluid flows into the first valve block, wherein the first inlet and the first outlet through which the fluid flows out of the first valve block are open at the first contact surface,
   the second control valve further has a second valve block having a second contact surface to be in contact with the surface of the block and a second outlet through which the fluid flows out of the second valve block, wherein the second outlet and the second inlet through which the fluid flows into the second valve block are open at the second contact surface.

5. The fluid control apparatus according to claim 1, wherein
   the first control valve and the second control valve have a width equal to that of the block.

6. The fluid control apparatus according to claim 1, wherein
   the internal flow channel has a confluent channel through which the fluid coming out of the first control valve and the second control valve flows, and a second outflow channel that connects between the confluent channel and a second outlet of the second control valve through which the fluid flows out thereof, a downstream portion of the first outflow channel is connected to the confluent channel, the fluid control apparatus further comprises a flow rate sensor that measures a flow rate of the fluid flowing through the confluent channel, and a fluid controller that controls at least one of the first control valve and the second control valve in response at least to the flow rate measured by the flow rate sensor.

7. The fluid control apparatus according to claim 6, wherein the fluid controller has an opening control unit that controls an opening of one of the first control valve and the second control valve so as to cause the fluid to flow at a target-share flow rate that is determined by dividing a set flow rate by a predetermined number of times, and a flow rate feedback control unit that controls the other one of the first control valve and the second control valve so as to decrease a deviation between the set flow rate and the flow rate measured by the flow rate sensor.

8. The fluid control apparatus according to claim 7, wherein the opening control unit has a target opening calculation unit that calculates a target opening corresponding to the target-share flow rate on a basis of a pressure of the fluid measured at a position upstream of the first control valve, and a voltage control unit that applies a voltage corresponding to the target opening to the one of the first control valve and the second control valve.

9. The fluid control apparatus according to claim 7, wherein the target-share flow rate is set to be one-half of the set flow rate.

10. The fluid control apparatus according to claim 6, wherein the fluid controller has a synchronization control unit that controls an opening of the first control valve and an opening of the second control valve in synchronization with each other.

11. The fluid control apparatus according to claim 10, wherein the first control valve and the second control valve are of a same type, and the synchronization control unit applies an identical voltage to the first control valve and to the second control valve so as to decrease a deviation between a set flow rate and the flow rate measured by the flow rate sensor.

12. The fluid control apparatus according to claim 6, wherein the fluid controller has a flow rate feedback control unit that controls one of the first control valve and the second control valve so as to decrease a deviation between a set flow rate and the flow rate measured by the flow rate sensor, a valve-abnormality detection unit configured to detect an abnormality in the first control valve and the second control valve, and a valve-control switching unit that causes the flow rate feedback control unit to control the other one of the first control valve and the second control valve when the valve-abnormality detection unit detects an abnormality in the one of the first control valve and the second control valve that is being controlled by the flow rate feedback control unit.

13. The fluid control apparatus according to claim 12, wherein the flow rate feedback control unit initially controls the second control valve, and the valve-control switching unit causes the flow rate feedback control unit to control the first control valve when the valve-abnormality detection unit detects an abnormality in the second control valve.

14. The fluid control apparatus according to claim 12, wherein the valve-abnormality detection unit is configured to detect an abnormality of insulation of the first control valve and the second control valve on a basis of a voltage applied thereto.

15. The fluid control apparatus according to claim 12, wherein the valve-abnormality detection unit is configured to detect an abnormality in the first control valve and the second control valve on a basis of an absolute value of a deviation between the set flow rate and the flow rate measured by the flow rate sensor.

16. The fluid control apparatus according to claim 1, wherein the internal flow channel has a first inflow channel connected to a first inlet of the first control valve through which the fluid flows thereinto, and a before-branch flow channel of which a downstream portion is connected to the first inflow channel and the second inflow channel, the fluid control apparatus further comprises a flow rate sensor that measures a flow rate of the fluid flowing through the before-branch flow channel, and a fluid controller that controls at least one of the first control valve and the second control valve in response at least to the flow rate measured by the flow rate sensor.

* * * * *